US012748435B2

(12) United States Patent
Tsai et al.

(10) Patent No.: US 12,748,435 B2
(45) Date of Patent: Sep. 29, 2026

(54) EFFICIENT PATH PLANNING METHOD FOR ROBOT USED FOR COLLECTING MARINE DEBRIS

(71) Applicant: Guangdong University of Science and Technology, Dongguan (CN)

(72) Inventors: Rong-Guei Tsai, Dongguan (CN); Shu Gong, Dongguan (CN); Wen Wang, Dongguan (CN); Ronghao Li, Dongguan (CN); Xiaolan Chen, Dongguan (CN); Lin Lin, Dongguan (CN); Delin Luo, Dongguan (CN); Shanna He, Dongguan (CN); Xinxin Chen, Dongguan (CN); Jung-Feng Tsai, Dongguan (CN)

(73) Assignee: GUANGDONG UNIVERSITY OF SCIENCE AND TECHNOLOGY, Dongguan (CN)

( * ) Notice: Subject to any disclaimer, the term of this patent is extended or adjusted under 35 U.S.C. 154(b) by 71 days.

(21) Appl. No.: 18/953,111

(22) Filed: Nov. 20, 2024

(65) Prior Publication Data

US 2026/0064127 A1 Mar. 5, 2026

(30) Foreign Application Priority Data

Sep. 3, 2024 (CN) ......................... 202411226982.6

(51) Int. Cl.
*G05D 1/622* (2024.01)
*B63B 35/32* (2006.01)

(Continued)

(52) U.S. Cl.
CPC ............. *G05D 1/622* (2024.01); *B63B 35/32* (2013.01); *B63B 79/40* (2020.01); *B63B 2035/006* (2013.01)

(58) Field of Classification Search
CPC .......... B63B 35/32; B63B 89/40; G05D 1/622
See application file for complete search history.

(56) References Cited

FOREIGN PATENT DOCUMENTS

| | | | | |
|---|---|---|---|---|
| CN | 115542887 A | * | 12/2022 | ........... G05D 1/0217 |
| KR | 101554498 B1 | * | 9/2015 | ............... G08G 3/00 |
| NL | 2029596 B1 | * | 6/2023 | ............. G06Q 10/04 |

OTHER PUBLICATIONS

Chen, Jingchuan, et al., "Path Planning Considering Time-Varying and Uncertain Movement Speed in Multi-Robot Automatic Warehouses: Problem Formulation and Algorithm", Dec. 1, 2022, arXiv.org (Year: 2022).*

(Continued)

*Primary Examiner* — Navid Z. Mehdizadeh
*Assistant Examiner* — Sarah A. Mueller

(57) ABSTRACT

An efficient path planning method for a robot used for collecting marine debris includes: traversing all target positions of the marine debris by depth-first search (DFS) to generate a target position sequence; and calculating a target position with a lowest total cost by a path planning algorithm, and setting the target position with the lowest total cost as a next target position to be traversed for the robot. The efficient path planning method can plan an optimal or near-optimal cleaning path for the robot based on real-time environmental information, reducing unnecessary path repetition and ineffective motion, thereby significantly improving the cleaning efficiency.

7 Claims, 6 Drawing Sheets

(51) Int. Cl.
*B63B 79/40* (2020.01)
*B63B 35/00* (2020.01)

(56) References Cited

OTHER PUBLICATIONS

Machine translation of Hou et al. (CN-115542887-A) (Year: 2022).*
Machine translation of Lee (KR-101554498-B1) (Year: 2015).*
Ou, Yangqi, et al., "Improved A* Path Planning Method Based on the Grid Map", Aug. 18, 2022 (Year: 2022).*

* cited by examiner

EFFICIENT PATH PLANNING METHOD FOR ROBOT USED FOR COLLECTING MARINE DEBRIS

CROSS-REFERENCE TO RELATED APPLICATION

This application claims priority to Chinese Patent Application No. 2024112269826, filed on Sep. 3, 2024, which is herein incorporated by reference in its entirety.

TECHNICAL FIELD

The disclosure relates to the field of marine collection, and more particularly to an efficient path planning method for a robot used for collecting marine debris.

BACKGROUND

Surface marine unmanned robotic force (SMURF) is an improved path planning method derived from a spiral-curvature algorithm for navigation (SCAN), which traverses an entire area based on full coverage. However, in a dynamic marine environment, traversing the entire area would waste a lot of time and electricity costs. Moreover, marine debris is dynamic, and some of the marine debris may not be collected by a robot during movement of the robot. Therefore, the SMURF assumes a static marine environment, which does not conform to real-world scenarios.

SUMMARY

In order to solve above problems, the disclosure provides an efficient path planning method for a robot used for collecting marine debris.

The technical solutions of the disclosure are as follows.

The efficient path planning method for the robot used for collecting the marine debris includes:

traversing all target positions of the marine debris by using a depth-first search (DFS) to generate a target position sequence; and determining a target position with a lowest total cost of the all target positions by using a path planning algorithm, and setting the target position with the lowest total cost as a next target position to be traversed for the robot.

In an embodiment, the robot includes a processor, a memory and a controller, the processor is connected to the memory and the controller, and the processor, the memory and the controller work together to perform above steps; and the efficient path planning method for the robot used for collecting the marine debris further includes: controlling, by the controller, the robot to move to the next target position to be traversed, and collecting, by the robot, marine debris at the next target position to be traversed.

In an embodiment, the traversing all target positions of the marine debris includes:

setting a threshold td, where a distance between the next target position to be traversed and a current position of the robot is less than or equal to the threshold td.

In an embodiment, a formula for the path planning algorithm is as follows:

$$f(G_i) = g(G_i) + h(G_i) + p(G_i)$$

where $f(G_i)$ represents a comprehensive priority corresponding to a current position $G_i$ of the robot, the comprehensive priority includes total costs of the all target positions relative to the current position $G_i$, $g(G_i)$ represents an actual cost from the current position $G_i$ to a starting position $G_s$, $h(G_i)$ represents an estimated cost from the current position $G_i$ to a target position $G_k$, and $p(G_i)$ represents an adaptive cost from the current position $G_i$ to the target position $G_k$.

In an embodiment, the actual cost is a distance cost consumed by the robot from the starting position $G_s$ to the current position $G_i$, and a formula of the actual cost is expressed as follows:

$$g(G_i) = \sum_{j=1}^{i} dist(G_s, G_j)$$

where $G_s$ represents the starting position, $G_i$ represents the current position, $G_j$ represents a j-th position, and $dist(G_s,G_j)$ represents a distance between $G_s$ and $G_j$.

In an embodiment, the estimated cost is calculated as follows:

$$h(G_i) = \sum_{j=i+1}^{k} dist(G_i, G_j)$$

$$dist(G_i, G_j) \le td$$

where $G_k$ represents the target position, $G_i$ represents the current position, $G_j$ represents the j-th position, and $dist(G_i,G_j)$ represents a distance between $G_i$ and $G_j$.

In an embodiment, the adaptive cost is calculated as follows:

$$p(G_i) = t_{i,k}$$

where $t_{i,k}$ represents travel time of the robot from the current position $G_i$ to the target position $G_k$.

In an embodiment, the travel time of the robot is determined based on a direction and a speed of a water current, when the water current is downstream, collection time and energy consumption are in an optimal state; when the water current is upstream, the collection time and the energy consumption are in a worst state.

In an embodiment, when the water current is in a direction same as a heading angle of the robot, the travel time $t_{i,k}$ of the robot is calculated as follows:

$$t_{i,k} = \frac{d}{T_e}$$

$$T_e = v + w \times \cos(\theta)$$

where v (distance per unit of time) represents a movement speed of the robot, w (with units of distance per unit of time) represents the speed of the water current, d represents a distance from a grid a to a grid b (i.e., a distance from the current position $G_i$ to the target position $G_k$), and θ (in degrees) represents the heading angle of the robot, and $T_e$ represents an effective velocity of the robot in the water current.

In an embodiment, when the water current is in a direction opposite to the heading angle of the robot (i.e., the water current is upstream), the travel time $t_{i,k}$ of the robot is calculated as follows:

$$t_{i,k} = \frac{d}{T_e}$$

$$T_e = v - w \times \cos(\theta)$$

where v (distance per unit of time) represents the movement speed of the robot, w (with units of distance per unit of time) represents the speed of the water current, d represents the distance from a grid a to a grid b (i.e., a distance from the current position $G_i$ to the target position $G_k$), and θ (in degrees) represents the heading angle of the robot, and $T_e$ represents an effective velocity of the robot in the water current.

Compared to the related art, the disclosure has the following beneficial effects.

The disclosure can plan an optimal or near-optimal cleaning path for the robot used for collecting marine debris based on real-time environmental information, reducing unnecessary path repetition and ineffective motion, thereby significantly improving the cleaning efficiency.

BRIEF DESCRIPTION OF DRAWINGS

The accompanying drawings generally illustrate various embodiments by way of example rather than limitation, and are used to explain embodiments of the disclosure in conjunction with the specification and claims. At appropriate times, same reference numerals are used in all the accompanying drawings to refer to same or similar parts. Such embodiments are illustrative and not intended to be exhaustive or exclusive embodiments of the device or method.

DETAILED DESCRIPTION OF EMBODIMENTS

It should be noted that the embodiments and features in the embodiments of the disclosure can be combined with each other without conflict. the disclosure is described in detail below with reference to the accompanying drawings and in conjunction with embodiments.

An embodiment of the disclosure provides an efficient path planning method for a robot used for collecting marine debris, which includes the following steps.

1. Definition and Assumptions

Figure 1:
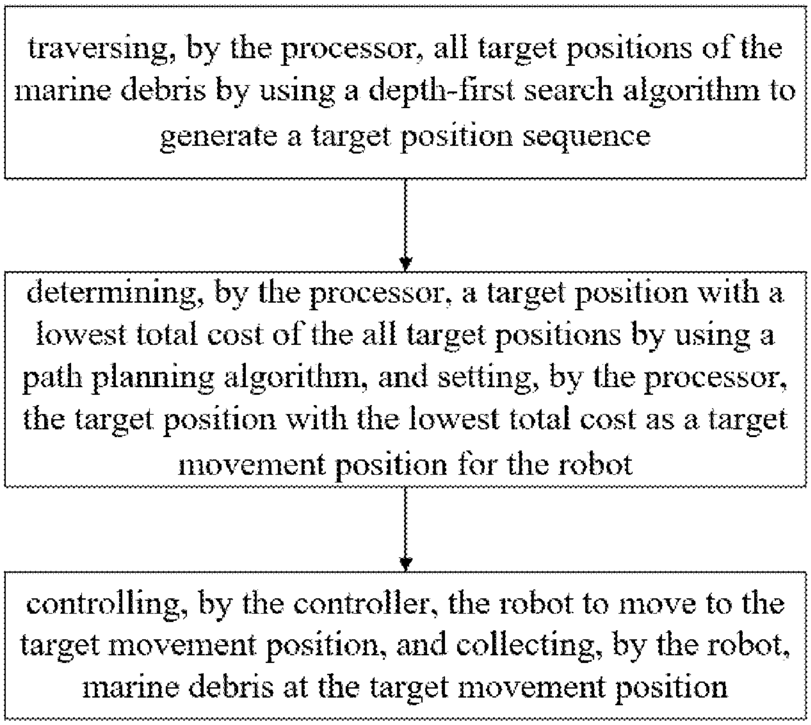
FIG. 1 illustrates a flow chart of an efficient path planning method for a robot used for collecting marine debris of the disclosure.
Figure 2:
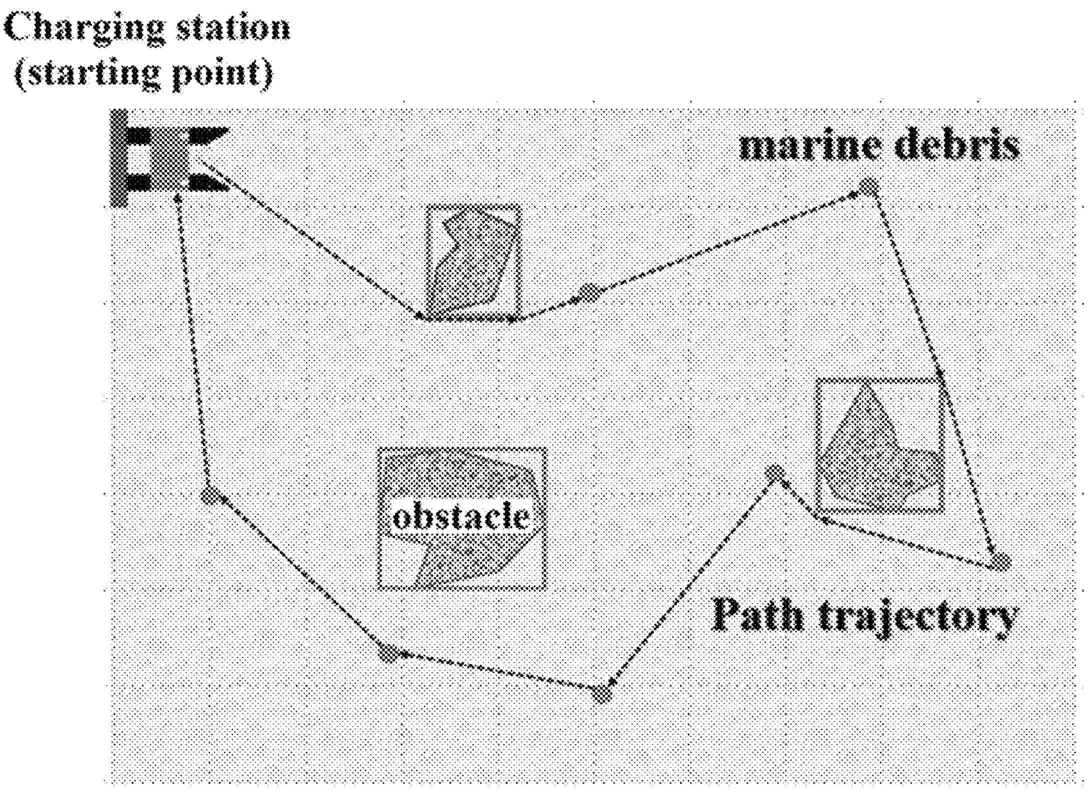
FIG. 2 illustrates a schematic diagram of an example of the robot used for collecting marine debris and its path plan of the disclosure.

In mobile A-star (MA*) algorithm, it is assumed that the robot can obtain positions of all marine debris through satellites. In the disclosure, obstacles are enclosed within rectangular frames, as shown in FIG. 2. Therefore, after obtaining coordinate positions of all four corners of the obstacles and the positions of the marine debris, an undirected graph can be established. Through the undirected graph, a distance matrix $MAT \in R^{((M+1)\times(M+1))}$ can be established, where MAT is defined as a Euclidean distance between any two points. Diagonal distances in the matrix MAT are all 0. In addition, the satellite updates position information of the marine debris at regular intervals. In the disclosure, after collecting a piece of marine debris, the robot requests the position information of the marine debris from the satellite.

$$MAT = MAT^T$$

$$\text{Diag}(MAT) = 0$$

2. Candidate Target Positions

Firstly, in the disclosure, target positions that the robot needs to move to must be determined. In the disclosure, it is assumed that there are marine debris with the number of N in the environment, and grids where the marine debris are located are referred to as the target positions. The target positions of the marine debris are traversed through DFS. To avoid prioritizing traversing farther marine debris during a traversal process, a threshold td is set, i.e., a distance between a next target position to be traversed and a current position of the robot must be less than or equal to the threshold td.

$$G_i = DFS(MAT)$$

$$\text{s.t. } dist(G_i, G_{i+1}) \le td$$

where a first target position to be traversed is assumed as $G_i$, and the next target position to be traversed is $G_{i+1}$, the distance between the target position to be traversed $G_i$ and the next target position to be traversed $G_{i+1}$ must be less than or equal to the threshold td. The reason for this design is to avoid the robot first traversing farther target positions before closer target positions, which would result in redundant paths, leading to excessive path length and waste of time and power costs.

Path Planning

To cope with a dynamic marine environment, where the marine debris is also in motion during the movement of the robot, the disclosure must consider the movement of the marine debris to identify the next target position to be traversed. After traversing through the DFS, a candidate sequence is obtained. Each target element in the candidate sequence undergoes individual path planning calculations. A target position with a lowest total cost is selected and set as the next target position to be traversed for the robot.

The disclosure designs a path planning algorithm called MA* based on the A-star (A*) algorithm and improvement of a heuristic function. In the MA* algorithm, the heuristic function is defined as follows:

$$f(G_i)=g(G_i)+h(G_i)+p(G_i)$$

where $f(G_i)$ represents a comprehensive priority corresponding to the current position $G_i$ of the robot, the comprehensive priority includes total costs of the all target positions relative to the current position $G_i$, when traversing next marine debris, the robot selects the marine debris with the best comprehensive priority (i.e., the lowest total cost) to traverse; $g(G_i)$ represents an actual cost from the current position $G_i$ to a starting position $G_s$, $h(G_i)$ represents an estimated cost from the current position $G_i$ to a target position $G_k$, and $p(G_i)$ represents an adaptive cost from the current position $G_i$ to the target position $G_k$.

The actual cost is a distance cost consumed by the robot from the starting position $G_s$ to the current position $G_i$, and a formula of the actual cost is expressed calculated as follows:

$$g(G_i)=\sum_{j=1}^{i} dist(G_s, G_j)$$

The estimated cost is calculated as follows; where $G_k$ represents the target position, and $G_i$ represents the current position.

$$h(G_i)=\sum_{j=i+1}^{k} dist(G_i, G_j)$$

$$dist(G_i, G_j)\le td$$

Considering the time and power costs, a last item in the comprehensive priority calculation is the adaptive cost, and $t_{i,k}$ represents travel time of the robot from the current position $G_i$ to the target position $G_k$. The travel time is determined based on the direction and speed of the water current. When the water current is downstream, collection time and energy consumption are in an optimal state; conversely, when the water current is upstream, the collection time and energy consumption are in a worst state.

$$p(G_i)=t_{i,k}$$

The following formulas are for calculating the travel time when the robot is heading towards a target grid, at downstream and upstream. v (distance per unit of time) represents a movement speed of the robot, w (with units of distance per unit of time) represents the speed of the water current, d represents a distance from a grid a to a grid b, and θ (in degrees) represents the heading angle of the robot.

When the water current is in a direction same as the heading angle of the robot, the travel time $t_{i,k}$ of the robot is calculated as follows:

$$t_{i,k}=\frac{d}{T_e}$$

$$T_e=v+w\times\cos(\theta)$$

When the water current is in a direction opposite to the heading angle of the robot (i.e., the water current is upstream), the travel time $t_{i,k}$ of the robot is calculated as follows:

$$t_{i,k}=\frac{d}{T_e}$$

$$T_e=v-w\times\cos(\theta)$$

Embodiment 1

The disclosure utilizes a Windows 11 operating system equipped with 16 gigabytes (GB) of DDR4-3000 memory. In terms of simulation development, the disclosure employs C/C++ language, MATLAB, and Gnuplot (a plotting tool) as auxiliary tools for plotting and complex calculations. The disclosure conducts four sets of experiments to compare the performance of five algorithms including: MA*, Greedy, rapidly-exploring random tree (RRT), SMURF, and underwater (U*), in terms of average path length and average number of collected marine debris. The four sets of experiments are conducted as follows: (A) changing the total number of marine debris, (B) changing the movement speed of the robot, (C) changing the size of the obstacles, and (D) changing the ocean current velocity (i.e., the speed of the water current). The parameters set for the experiments are listed in Table 1.

TABLE 1 parameter setting

| Parameters | Values |
|---|---|
| Area size | 300 meters (m) × 300 m |
| number of the robot | 1 |
| movement speed of the robot, $R_v$ | 2-10 meters per second (m/s) |
| total number of executions, et | 100 times |
| runtime for each experiment | 3000 s |
| detection radius, DR | 10-100 m |
| detection frequency, $T_d$ | 1-10 s |
| total number of marine debris | 50 |
| direction of the ocean current, $c_d$ | 0-2π |
| velocity of the ocean current, $c_v$ | 1-2.8 m/s |

The average path length $Avg_{length}$ is calculated by the following formula:

$$Avg_{length}=\left(\sum_{m=1}^{exe}\sum_{i=1}^{n+1}\sum_{j=1}^{n+1} d(Gi, Gj)e_{ij}\right)\times\frac{1}{exet}$$

-continued $$e_{ij} = \{0, 1\}$$

where exet represents a total number of executions. If there is an edge E between a grid i and a grid j, $e_{ij}=1$; otherwise, $e_{ij}=0$.

The following formula defines the average number of collected marine debris $GN_{avg}$:

$$GN_{avg} = \sum_{m=1}^{exet} GN_m \times \frac{1}{exet}$$

where $GN_m$ represents the number of collected marine debris in a m-th experiment. Additionally, if the distance between the robot and the marine debris is less than 1 m, it is considered a successful collection; otherwise, it is a failure. exet represents the total number of executions.

To make the experiments closer to reality, in addition to using OrcaFlex software (a dynamic analysis software for offshore marine systems) to simulate the marine environment for a movement pattern of the marine debris, the disclosure adopts the Ocean current model (kinematic model)[24] as an ocean movement model. The kinematic model of the Ocean current model can be written as:

$$Vx = k1\lambda V\sin(k2x)\cos(k3y) + k1\lambda\cos(2k1t) + k4$$

$$Vy = -\lambda V\cos(k2x)\sin(k3y) + k5$$

where Vx represents a velocity on an x-axis, Vy represents a velocity on a y-axis, k1, k2, k3, λ and V represent variables closely related to environmental factors such as tides and water depth. These parameters vary in different environments, as shown in Table 2.

TABLE 2 parameter setting of the Ocean current model

| Parameters | Mean | std |
|---|---|---|
| k1, k2 | π | 0.1 π |
| k3 | 2π | 0.2 π |
| k4, k5 | 1 | 0.1 |
| V | 1 | 0.1 |
| λ | 0.5-3.0 | 0.05-0.3 |

The Effects of the Number of the Marine Debris

This set of experiments compares the effects of changing the total number of the marine debris on the total path length of the robot and the efficiency of marine debris collection for five methods. The robot starts from the top-left corner of the area, with a speed of 3 m/s, and each experiment executes for 3000 seconds (s).

Figure 3:
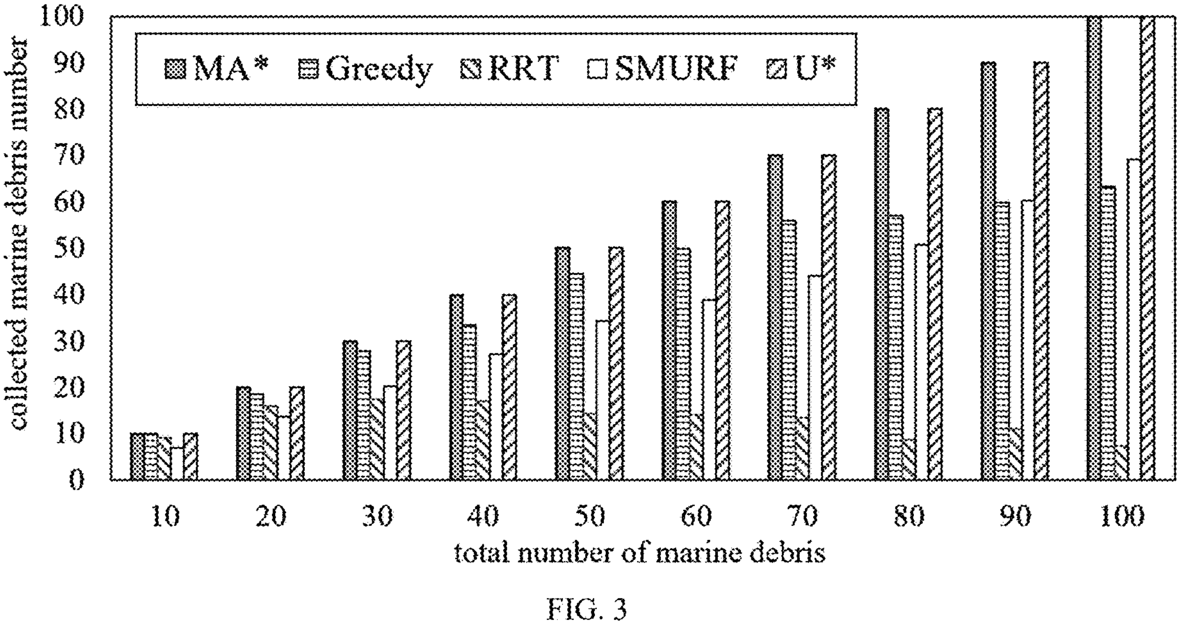
FIG. 3 illustrates a schematic diagram of a comparison of a collected marine debris number between five algorithms of the disclosure.
Figure 4:
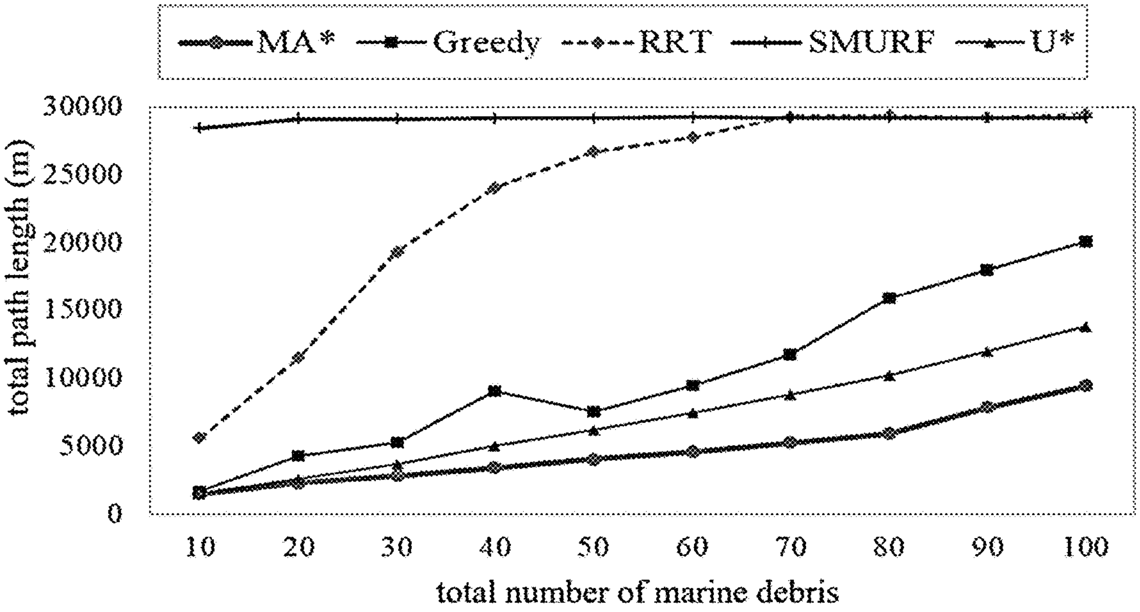
FIG. 4 illustrates effects of the marine debris number on a total path length of the disclosure.

FIG. 3 and FIG. 4 show results for the number of collected marine debris and the average path length, respectively.

In FIG. 3, the MA* algorithm demonstrates a relatively stable collecting efficiency under different total numbers of marine debris, with the number of collected marine debris increasing as the total number of the marine debris increases, showing good performance. Its total path length is relatively short, indicating that the MA* algorithm can collect more debris in a shorter path, which may be due to the efficiency of the MA* algorithm in path planning and search. The Greedy algorithm shows a stable performance in capturing the number of the marine debris but is slightly less effective compared to the MA* algorithm. The total path length of the Greedy algorithm is slightly longer, possibly due to its greedy selection strategy leading to less optimized path planning. The RRT algorithm shows instability in collection efficiency and the path length, with significant fluctuations, indicating the uncertainty brought by its randomness.

In FIG. 4, for the analysis of the average path length, the MA* algorithm shows a relatively short path length under various total numbers of the marine debris, indicating that the MA* algorithm has a certain efficiency advantage in path planning. The Greedy algorithm ranks second, but still performs stably, being more reliable compared to the RRT algorithm, the SMURF algorithm, and the U* algorithm. The path length of the RRT algorithm fluctuates greatly, which may require a more stable path planning strategy to improve efficiency. The SMURF algorithm and the U* algorithm perform averagely in terms of path length, and may need further optimization of path planning strategies to improve efficiency and stability.

The Effects of the Movement Speed of the Robot

Figure 5:
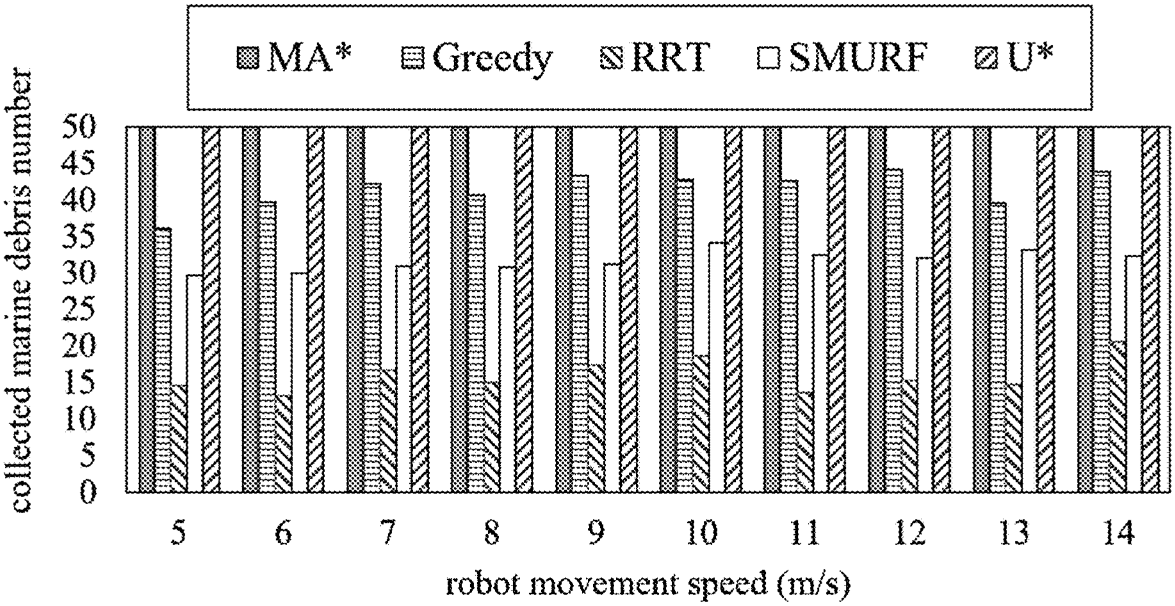
FIG. 5 illustrates effects of an average robot movement speed on an average collected marine debris number of the disclosure.
Figure 6:
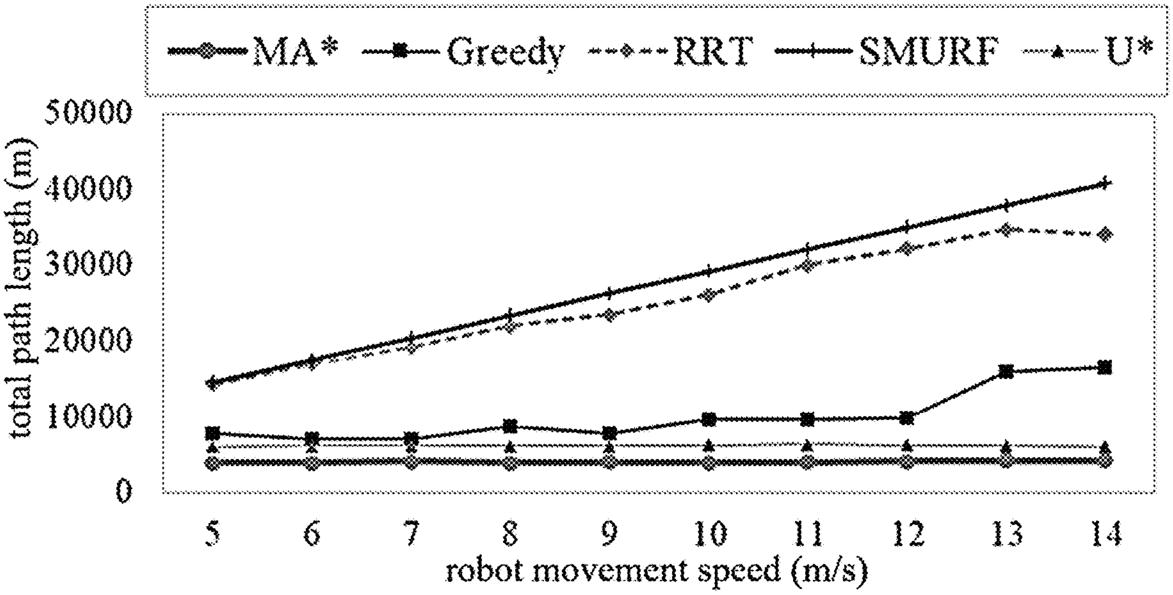
FIG. 6 illustrates effects of a robot movement speed on an average path length of the disclosure.

This set of experiments compares the effects of changes in the robot movement speed on the total path length and the efficiency of marine debris collection for five methods. 50 pieces of marine debris are randomly generated, and the robot starts from the top-left corner of the area. The robot movement speed is increased from 5 m/s to 14 m/s, with each experiment executing for 3000 s. FIG. 5 and FIG. 6 show results for the average path length and the number of collected marine debris at different robot movement speeds.

In FIG. 5, the disclosure observes the performance of various algorithms at different robot movement speeds. The MA* algorithm shows relatively stable results in terms of the number of the collected marine debris and the total path length, demonstrating good collection efficiency and path planning capabilities. The Greedy algorithm performs second-best in the number of the collected marine debris but has a relatively short total path length, indicating its relative efficiency in path planning. The RRT and SMURF algorithms perform averagely in collection efficiency but have relatively longer path lengths, which may require more optimized path planning strategies. The U* algorithm performs fairly average in both collection efficiency and path length, and may need further improvement to enhance its performance.

In FIG. 6, the MA* algorithm shows a shorter path length, indicating its efficiency in path planning. The Greedy algorithm performs second-best, but remains stable at different robot movement speeds. The average path lengths of the RRT and SMURF algorithms are longer, possibly due to the need for further optimization of their path planning strategies. The U* algorithm performs averagely in average path length and may need improvements to enhance path planning effectiveness. Different algorithms show their own characteristics in the marine debris collection efficiency and the average path length. The MA* algorithm is relatively excellent in both the collection efficiency and the path length, while other algorithms need further improvement to enhance their performance.

The Effects of Obstacle Size

This set of experiments compares the effects of the obstacle size on the marine debris. The disclosure randomly generates 50 marine debris, with obstacle sizes increasing from 10% to 55%. The robot starts from the top-left corner of the area, with a movement speed set at 3 m/s, and each experiment for 3000 s.

Figure 7:
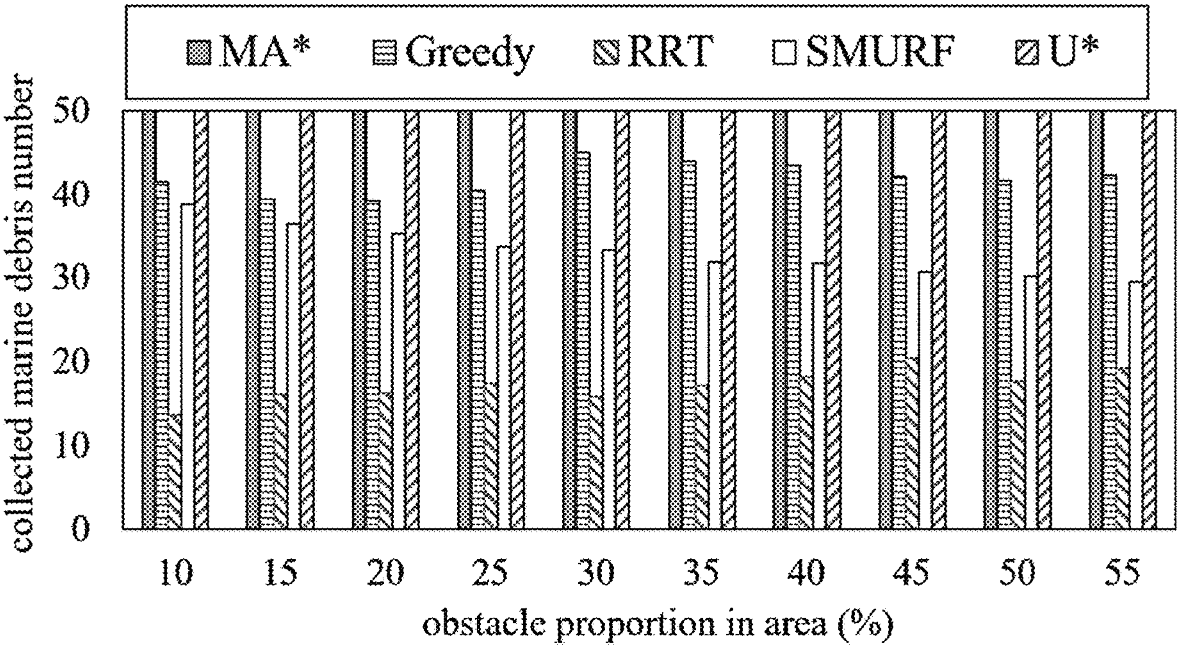
FIG. 7 illustrates a schematic diagram of effects of an obstacle size on the average collected marine debris number of the disclosure.
Figure 8:
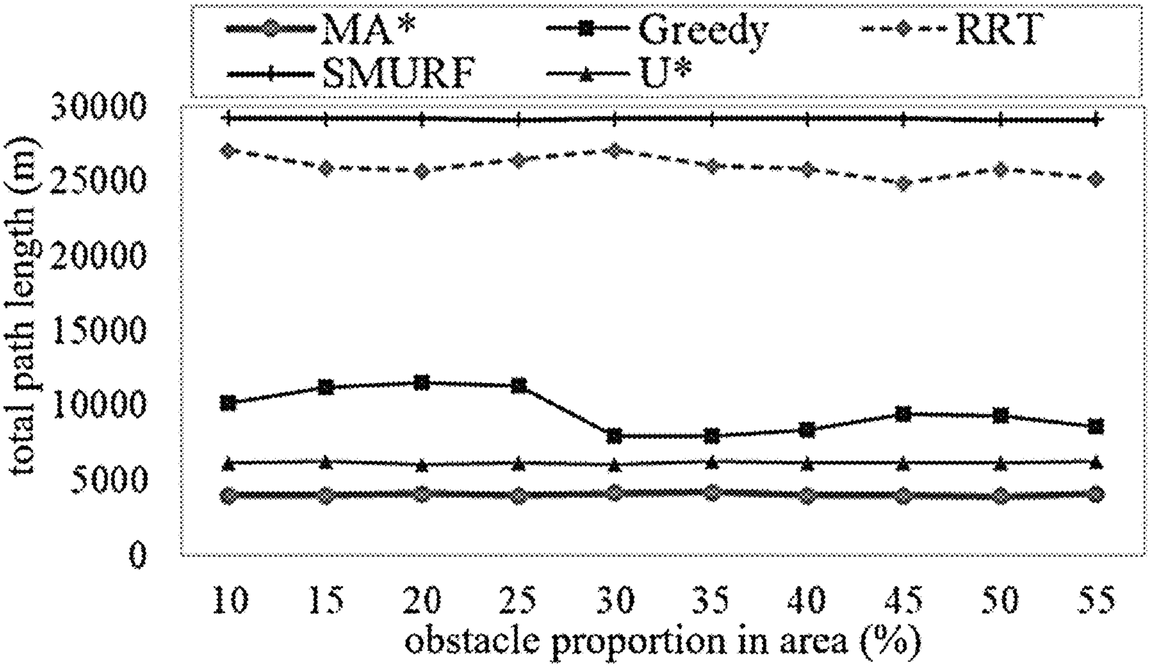
FIG. 8 illustrates a schematic diagram of effects of the obstacle size on the average path length of the disclosure.

FIG. 7 and FIG. 8 show the relationship between the detection frequency and the average path length as well as the number of the collected marine debris. Based on the provided experimental data, the disclosure focuses on the effects of a total obstacle area proportion of on the efficiency of marine debris collection and the average path length. As the obstacle area proportion increases, the performance of different algorithms also varies. In FIG. 7, the MA* algorithm performs well at a low obstacle area proportion but experiences a decline in efficiency as the obstacle area proportion increases; the Greedy algorithm excels at a high obstacle area proportion but has lower collection efficiency at the low obstacle area proportion; the RRT and SMURF algorithms show relatively stable performance at different obstacle area proportions, but need improvement in the collection efficiency and the path length; and the U* algorithm generally performs average and has weaker adaptability to different obstacle proportions.

In FIG. 8, as the obstacle area proportion increases, the path lengths of various algorithms also show different changes. The MA* algorithm has a shorter path length at the low obstacle area proportion, but as the obstacle area proportion increases, the path length increases; the Greedy algorithm has a relatively shorter path length at the high obstacle area proportion; the RRT and SMURF algorithms perform rather average at different proportions, with significant fluctuations in path length; and the U* algorithm shows a more stable performance in path length but generally performs average. The total obstacle area proportion significantly affects the efficiency of marine debris collection and the path length. Different algorithms show their own characteristics at different proportions, with the MA* and Greedy algorithms performing excellently in some cases, but other algorithms still need further improvement to enhance adaptability and efficiency. Changes in the path length indicate differences in path planning among algorithms, and it is necessary to choose the appropriate algorithm based on specific situations to improve the efficiency of marine debris collection and the precision of path planning.

This set of experiments compares the efficiency of marine debris collection when the ocean current velocity varies. 50 marine debris are randomly generated, with the ocean current velocity increasing from 2.2 m/s to 4 m/s. The robot starts from the top-left corner of the area, with a detection radius set at 50 m, a detection frequency of once every 10 s, the robot movement speed set at 3 m/s, the ocean current velocity increasing from 1 m/s to 2.8 m/s, and each experiment lasting for 3000 s.

Figure 9:
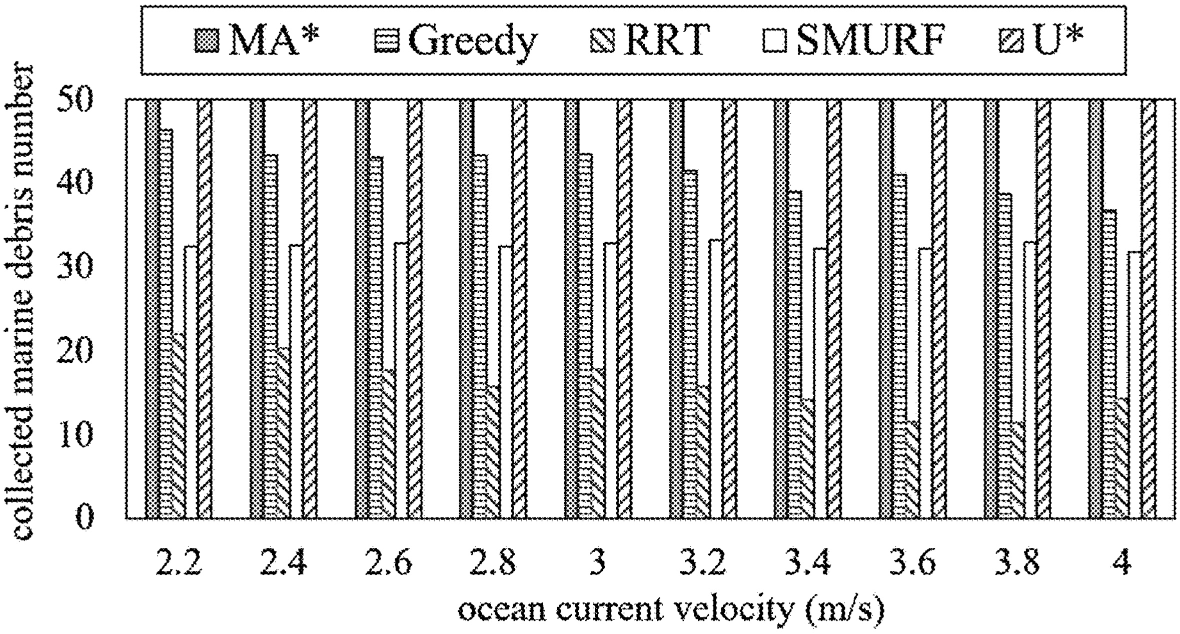
FIG. 9 illustrates a schematic diagram of effects of an ocean current velocity on the average collected marine debris number of the disclosure.
Figure 10:
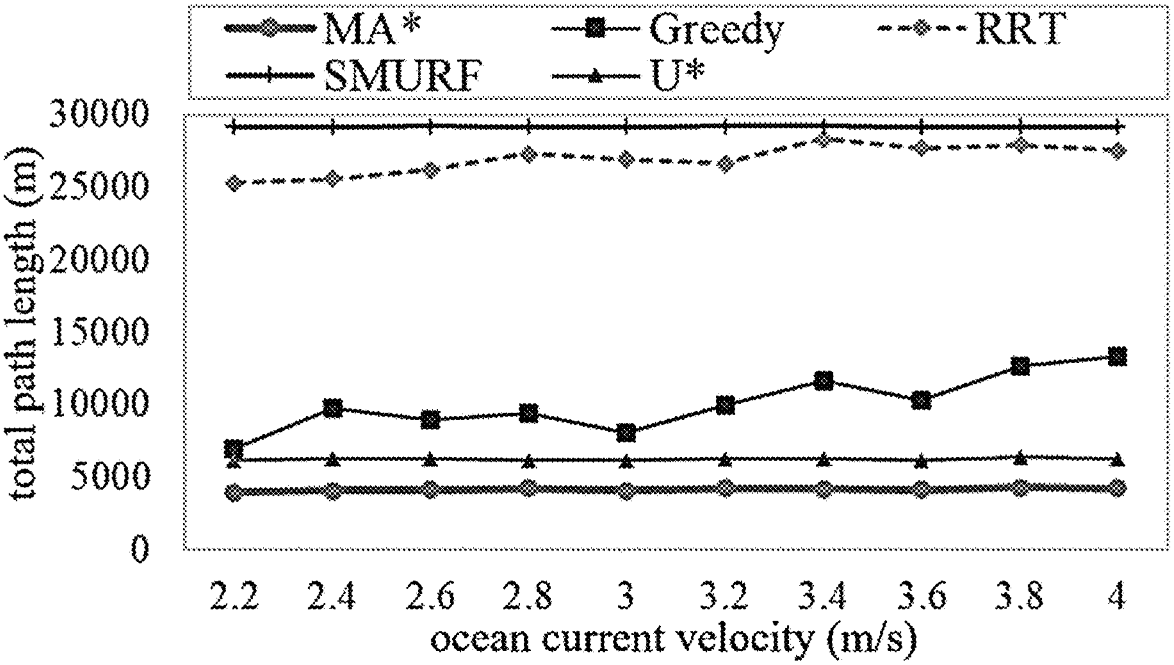
FIG. 10 illustrates a schematic diagram of effects of the ocean current velocity on the average path length of the disclosure.

FIG. 9 and FIG. 10 provide results showing the relationship of the average path length and the number of collected marine debris at different ocean current velocities. Based on the provided experimental data, the disclosure focuses on the effects of ocean current velocity on the efficiency of marine debris collection and the average path length. As the ocean current velocity varies, different algorithms show different performances in the collection efficiency and the path length. In FIG. 9, the MA* algorithm performs relatively stable at low ocean current velocities, but the efficiency declines as the ocean current velocity increases; the Greedy algorithm performs better at high velocities but has lower collection efficiency at low ocean current velocities; the RRT and SMURF algorithms show significant fluctuations at different velocities, with room for improvement in the collection efficiency and the path length; and the U* algorithm generally performs average and has weaker adaptability to changes in ocean current velocities.

In FIG. 10, as the ocean current velocity increases, the path lengths of various algorithms also show different changes. The MA* algorithm has relatively shorter path lengths at low ocean current velocities, but as the ocean current velocity increases, the path length increases; the Greedy algorithm has relatively shorter path lengths at high ocean current velocities; the RRT and SMURF algorithms perform rather average at different ocean current velocities, with significant fluctuations in path length; and the U* algorithm shows a more stable performance in the path length but generally performs average. The ocean current velocity significantly affects the efficiency of marine debris collection and the path length. Different algorithms show their own characteristics at different ocean current velocities, with the MA* and Greedy algorithms performing excellently in some cases, but other algorithms still need further improvement to enhance adaptability and efficiency. Changes in the path length indicate differences in path planning among algorithms, and it is necessary to choose the appropriate algorithm based on specific situations to improve the efficiency of marine debris collection and the precision of path planning.

The above is only a preferred specific embodiment of the disclosure, but the scope of protection of the disclosure is not limited to this. Within the technical scope disclosed in the disclosure, any equivalent substitution or change made by those skilled in the art according to the technical solution and inventive concept of the disclosure should be included in the scope of protection of the disclosure.

What is claimed is:

1. A path planning method for a robot used for collecting marine debris, wherein the robot comprises a processor and a controller, and the processor is connected to the controller; and the path planning method comprises:

traversing, by the processor, all target positions of the marine debris by using a depth-first search (DFS) algorithm to generate a target position sequence;

determining, by the processor, a target position with a lowest total cost of the all target positions by using a path planning algorithm, and setting, by the processor, the target position with the lowest total cost as a target movement position for the robot; and controlling, by the controller, the robot to move to the target movement position, and collecting, by the robot, marine debris at the target movement position;

wherein a formula for the path planning algorithm is as follows:

$$f(G_i)=g(G_i)+h(G_i)+p(G_i)$$

where $f(G_i)$ represents a comprehensive priority corresponding to a current position $G_i$ of the robot, the comprehensive priority comprises total costs of the all target positions relative to the current position $G_i$, $g(G_i)$ represents an actual cost from the current position $G_i$ to a starting position $G_s$ of the robot, $h(G_i)$ represents an estimated cost from the current position $G_i$ to a target position $G_k$, and $p(G_i)$ represents an adaptive cost from the current position $G_i$ to the target position $G_k$;

wherein the adaptive cost is calculated as follows:

$$p(G_i) = t_{i,k}$$

where $t_{i,k}$ represents travel time of the robot from the current position $G_i$ to the target position $G_k$.

2. The path planning method for the robot used for collecting the marine debris as claimed in claim 1, wherein the traversing all target positions of the marine debris comprises:

setting a threshold td, wherein a distance between the target movement position and the current position of the robot is less than or equal to the threshold td.

3. The path planning method for the robot used for collecting the marine debris as claimed in claim 1, wherein the actual cost is a distance cost consumed by the robot from the starting position $G_s$ to the current position $G_i$, and a formula of the actual cost is expressed as follows:

$$g(G_i) = \sum_{j=1}^{i} dist(G_s, G_j)$$

where $G_s$ represents the starting position, $G_i$ represents the current position, and $dist(G_s, G_j)$ represents a distance between $G_s$ and $G_j$.

4. The path planning method for the robot used for collecting the marine debris as claimed in claim 1, wherein the estimated cost is calculated as follows:

$$h(G_i) = \sum_{j=i+1}^{k} dist(G_i, G_j)$$

$$dist(G_i, G_j) \leq td$$

where $G_k$ represents the target position, $G_i$ represents the current position, and $dist(G_i, G_j)$ represents a distance between $G_i$ and $G_j$.

5. The path planning method for the robot used for collecting the marine debris as claimed in claim 1, wherein the travel time of the robot is determined based on a direction and a speed of a water current; when the water current is downstream, collection time and energy consumption are in an optimal state; when the water current is upstream, the collection time and the energy consumption are in a worst state.

6. The path planning method for the robot used for collecting the marine debris as claimed in claim 5, wherein when the water current is in a direction same as a heading angle of the robot, the travel time $t_{i,k}$ of the robot is calculated as follows:

$$t_{i,k} = \frac{d}{T_e}$$

$$T_e = v + w \times \cos(\theta)$$

where v represents a movement speed of the robot, w represents the speed of the water current, d represents a distance from the current position $G_i$ to the target position $G_k$, θ represents the heading angle of the robot, and $T_e$ represents an effective velocity of the robot in the water current.

7. The path planning method for the robot used for collecting the marine debris as claimed in claim 5, wherein when the water current is upstream in a direction opposite to a heading angle of the robot, the travel time $t_{i,k}$ of the robot is calculated as follows:

$$t_{i,k} = \frac{d}{T_e}$$

$$T_e = v - w \times \cos(\theta)$$

where v represents a movement speed of the robot, w represents the speed of the water current, d represents a distance from the current position $G_i$ to the target position $G_k$, and θ represents the heading angle of the robot, and $T_e$ represents an effective velocity of the robot in the water current.

* * * * *